United States Patent [19]

Boettle et al.

[11] Patent Number: 4,903,260
[45] Date of Patent: Feb. 20, 1990

[54] DIGITAL CIRCUIT-SWITCHING AND PACKET-SWITCHING NETWORK AND SWITCHING FACILITY THEREFOR

[75] Inventors: Dietrich Boettle, Buchenweg; Helmuth Preisach, Murr; Karl Schrodi, Heimsheim, all of Fed. Rep. of Germany

[73] Assignee: Alcatel N.V., Amsterdam, Netherlands

[21] Appl. No.: 149,664

[22] Filed: Jan. 28, 1988

[30] Foreign Application Priority Data

Jan. 29, 1987 [DE] Fed. Rep. of Germany ....... 3702614

[51] Int. Cl.$^4$ ............................................. H04Q 11/04
[52] U.S. Cl. ...................................................... 370/60
[58] Field of Search ...................... 370/60, 94, 58, 61, 370/63; 340/825.79, 825.8

[56] References Cited

U.S. PATENT DOCUMENTS

| 4,539,676 | 9/1985 | Lucas | 370/60 |
|---|---|---|---|
| 4,635,250 | 1/1987 | Georgiou | 370/58 |
| 4,731,785 | 3/1988 | Ferenc et al. | 370/60 |

FOREIGN PATENT DOCUMENTS

| 3441501 | 5/1986 | Fed. Rep. of Germany . |
|---|---|---|
| 3504835 | 8/1986 | Fed. Rep. of Germany . |
| 3510566 | 10/1986 | Fed. Rep. of Germany . |
| 3543392 | 6/1987 | Fed. Rep. of Germany . |

OTHER PUBLICATIONS

A. Chalet et al., "Datenmodul-Architektur mit Paketverarbeitungsfunktionen," *Elektrisches Nachrichtenwesen*, vol. 59, No. ½, 1985.

John J. Kulzer et al., "Statistical Switching Architectures for Future Services", ISS '84 Florence, May 7-11, 1984, (Session 43 A Paper 1).

A. Thomas et al., "Asynchronous Time-Division Techniques: an Experimental Packet Network Integrating Videocommunication", idem (Session 32 C Paper 2).

Selected definitions from "NTG-Empfehlung 0902", 1982, items 4.2.1 and 4.2.2, published in ntz, No. 8/82, p. 549.

Primary Examiner—Robert L. Griffin
Assistant Examiner—Frank M. Scutch, III
Attorney, Agent, or Firm—Christie, Parker & Hale

[57] ABSTRACT

A digital switching network is disclosed in which paths can be preset from any inlet to any outlet either for circuit-switched connections or for packet-switched messages (packets), as required. At any point in time, the paths preset for the packet-switched messages form a network whose nodes lie in the switching facilities of the switching network. The switching facilities contain the functional units required to switch each data packet on the path preset for it. This makes it possible to dynamically divide a single switching network into a circuit-switching network and a packet-switching network as required.

8 Claims, 1 Drawing Sheet

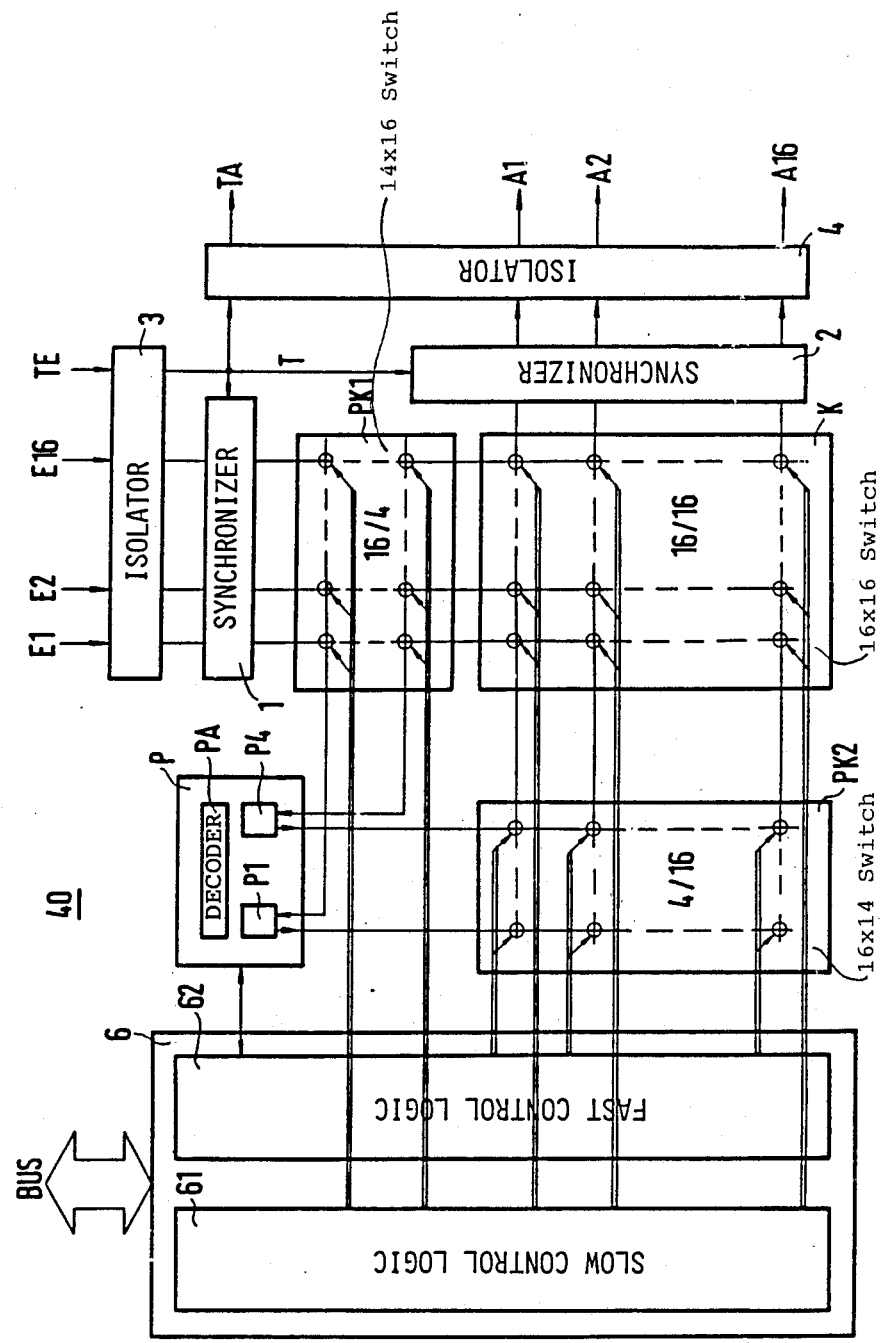

DIGITAL CIRCUIT-SWITCHING AND PACKET-SWITCHING NETWORK AND SWITCHING FACILITY THEREFOR

TECHNICAL FIELD

The present invention relates to a digital switching network and to a switching facility therefor.

CROSS REFERENCE TO RELATED APPLICATION

For further details of a broadband switching module which may be of use in the presently preferred embodiment disclosed herein but which are not deemed necessary for an understanding of the present invention, reference may be made to commonly assigned co-pending U.S. application Ser. Nos. 100,122 filed Sept. 23, 1987 (T. Banniza 1-4-1-4: Method and Apparatus for Improving Bandwidth and Broadband Switch Module Employing Same) and 111,935 filed Oct. 21, 1987 (G. Kaltbeitzel 2-5-1-5: Test Circuit Arrangement for a Communication Network and test Method Using Same), which are hereby incorporated by reference, and to published Fed. Rep. Germany application Nos. DE 35 04 835 A1 (M. Klein 1-1: Circuit for Monitoring Digital Signals), DE 35 10 566 A1 (D. Boettle 9-1-2: Digital Broadband Switching Element and Broadband Switching Network), DE 34 41 501 A1 (M. Klein 2-2: Circuit Arrangement for Regenerating and Synchronizing a Digital Signal) and DE 35 43 392 A1 (M. Klein 3-3-1: Circuit Arrangement for Regenerating and Synchronizing a Digital Signal). English language translations of the referenced German patent applications are contained in the application file hereof, and are hereby also incorporated by reference.

BACKGROUND ART

To an increasing extent, digital equipment is being used for the transmission of information, Moreover, data transmission is gaining increasing significance. To meet anticipated future requirements, therefore, a communication network is needed which is equally well suited to switching different types of information. The services to be integrated in such a network differ in various ways. For example, one can distinguish between services where a fairly steady information flow exists during relatively short periods of time, and services where information flows briefly from time to time over prolonged periods of time. There are two different switching methods adapted to those requirements. A switching method in which a direct transmission path between the terminals involved is made available for the duration of a call, regardless of whether information is transmitted or not, is called "circuit switching". A switching method in which the messages are divided into packets and routed through the network link by link with the aid of destination information contained in a packet header is called "packet switching". The packets are stored until a path in a desired direction becomes free. There is no through-switching of transmission paths. A special case is store-and-forward switching, where undivided messages are routed through the data network link by link from switching center to switching center, e.g., in electronic mail systems. More formal definitions are contained in "NTG-Empfehlung 0902", 1982, items 4.2.1 and 4.2.2 (published in "ntz," No. 8/82, page 549), which are hereby incorporated by referenced.

Obviously the switching equipment must be comparable with the particular switching method utilized.

One way of performing both circuit switching and packet switching is described in an article by A. Chalet and R. Drignath, "Datenmodul-Architektur mit Paketverarbeitungsfunktionen," *Elektrisches Nachrichtenwesen*, Vol. 59, No. ½, 1985. In that system, packet switching is effected by storing each packet in a packet memory at the input of the switching center, then setting up a path through the switching network like in a circuit-switching system, then transmitting the packet over this path, and finally clearing this path. To accelerate the setting up of a path for each packet, the parameters necessary for call setup (in particular, the destination address) are determined in a call setup phase and are stored so as to be immediately available upon arrival of a packet.

A completely different proposal was presented by John J. Kulzer and Warren A. Montgomery at the ISS '84 Florence, 7–11 May 1984, in a paper entitled "Statistical Switching Architectures for Future Services" (Session 43 A Paper 1). A similar proposal was submitted at the same conference by A. Thomas et al., "Asynchronous Time-Division Techniques: an Experimental Packet Network Integrating Videocommunication" (Session 32 C Paper 2). According to those proposals, all information, from sporadically occurring single instructions to digitized video signals, is divided into packets and passed on by packet switching. According to FIG. 6 of the Kulzer article and the pertinent description, the individual packets are routed through an exchange from stage to stage, where they are temporarily stored as required.

Both prior art solutions outlined above have advantages and disadvantages. If signals have to be switched at high transmission speeds (so-called broadband switching), some of those advantages and disadvantages are particularly significant.

DISCLOSURE OF INVENTION

It will thus be appreciated that overall objectives of the present invention are to provide a novel switching network and a related novel switching facility which combine many advantages of both circuit-switching and packet-switching to provide significant improvements over the prior art.

A digital switching network constructed in accordance with to the invention is so designed that paths from any inlet to any outlet can either be set up for circuit-switched connections or be preset for packet-switched messages (packets), as required. At any given point of time, the paths preset for packet-switched messages form a network whose nodes lie in the switching facilities of the switching network. The switching facilities contain the functional units required to switch each packet on its particular preset path.

This makes it possible to dynamically divide a single switching network into a circuit-switching network and a packet-switching network as required.

Not only the structure of such a switching network, but also its construction with circuit boards, connectors, racks, and wiring are essentially the same as in a pure circuit-switching network or a pure packet-switching network. Compared to a pure circuit-switching network or a pure packet-switching network, additional circuitry is required only in those modules which contain the crosspoints. In modern switching equipment, the switch facility modules are typically implemented as large-scale-integrated circuits. The additional circuitry required to practice the present invention results in a slight increase in the circuit complexity of such modules, but without any change in the number and arrangement of terminal pins; although the control of such a switching facility, which is under program control, and/or possibly enhanced power supply may add slightly to the expense of the required equipment. With such a relatively slight additional expenditure, however, both packet-switched and circuit-switched connections can be established as required.

BRIEF DESCRIPTION OF DRAWINGS

The FIGURE shows a block diagram of an exemplary broadband switching module constructed in accordance with the invention.

BEST MODE FOR CARRYING OUT THE INVENTION

The invention will be described in the context of a space-division multiplex broadband switching network in which the switching facilities are designed as broadband integrated switching modules; first the switching module (switching facility) and then the switching network will be described.

However, it will be understood that the teachings of the invention are not necessarily limited either to broadband applications (more correctly: high-data-rate applications) or to space-division multiplex switching. The terms used herein, such as input, output, channel, path, and connection, should thus be understood as broadly referring to terminals, pins, conductor tracks, and time slots (in a TDM signal).

Reference should now be made to the FIGURE, which shows a block diagram of a broadband switching module 40 as an example of a switching facility in accordance with the invention.

The broadband switching module 40 has 16 signal inputs E1 . . . E16 ad a clock input TE. These inputs are followed by an input isolation amplifier 3. For the signals coming from the signal inputs E1 . . . E16, the input isolation amplifier 3 is followed by an input synchronizer 1. Also applied to the input synchronizer 1. Thus, bit-synchronous digital signals appear at the outputs of the input synchronizer 1. These outputs are connected to the column lines of a switching matrix K. The row lines of this switching matrix K are connected to inputs of an output synchronizer 2, in which the signals are again (bit-) synchronized with the clock T. These signals and the clock T pass through an output isolation amplifier 4 to signal outputs A1 . . . A16 and a clock output TA. Crosspoints at the intersections of column lines and row lines in the switching matrix K are controlled by a decode and control logic 6 (double lines in the FIGURE). The broadband switching module 40 is controlled and monitored via a control bus BUS by means of the decode and control logic 6.

This broadband switching module 40, which contains all the devices necessary for circuit switching, is supplemented with devices which alternatively permit packet switching. The most important unit for this purpose is a packet-handling unit P. For the embodiment now being described, it will be assumed that a maximum of one quarter of the signal paths will be needed for packet switching at any given time. The packet-handling unit P therefore contains four subunits P1 . . . P4, each of which has a signal input that can be connected by means of a first packet-switching matrix PK1 to a column line coming from any of the signal inputs E1 . . . E16. If the number of subunits is equal to the number of signal inputs, the first packet-switching matrix PK1 is replaced by direct connections.

As packet-switching devices are known per se, the tasks and the basic design of the packet-handling unit P and the subunits contained therein, P1 . . . P4, are known in principle, too. The main task of the handling unit P is to determine the further path for each packet and to route this packet over this path, i.e., to a particular signal output A1 . . . A16. First of all it is necessary to identify the packets as such, which necessitates detecting the start of a new packet. For this synchronization task, a wide variety of solutions is available. In principle, each packet consists of two parts. The first part, which is usually also the first in time and precedes the packet as a header, contains all data required to control the exchange of information. The second part contains the information itself. The first part (header) must at least contain the data required to determine the further path. In addition, it may contain other typoes of data, such as, for example, data used to provide synchronization or data identifying the sender. Whether the header of the packet remains unchanged all the way from the sender to the recipient and therefore contains all data necessary for this purpose or whether the header is renewed link by link by preset information is relatively unimportant to the braoder aspects of the present invention.

If a packet has a predetermined length, for example, all packets in the switching network may be in synchronism, which would make it possible to apply to all broadband switching modules of the switching network an external signal marking the start of a packet. If, at the input of the switching network, the packet is then provided with a header containing two bits for each stage of the switching network, and thus, for each broadband switching module 40 (which each serves to select one of the four possible signal outputs) to be traversed by the packet, the handling unit P can be of very simple design. The handling unit P is then in a position to determine the instant at which the two address bits intended for this particular broadband switching module appear; these and the preceding address bits which were needed to address the preceding stages need not be passed on to the following stages. It is therefore sufficient to transfer the packet to the proper signal output after only these two address bits have been evaluated. In that case, the through-connection may take place in the switching matrix K. The handling unit P must then select one of the 16 signal outputs A1 . . . A16 from the two received address bits in an address decoder PA and cause the decode and control logic 6 to activate the appropriate crosspoint of the switching matrix K.

In practice, however, a handling unit P of such simple design meets only quite simple requirements. Provision should be made to protect against possible data loss in the event that two packets simultaneously arriving at two different signal inputs E1 . . . E16 have to be routed to the same signal output. In that case, the packet which cannot be switched through immediately should be temporarily stored and then passed on. This requires suitable buffers in the subunits P1 . . . P4. Furthermore, output must then be possible from the subunits P1 . . . P4 to the signal outputs A1 . . . A16. For this purpose, a second packet-switching matrix PK2 is provided. The crosspoints of this second packet-switching matrix PK2 are also controlled from the decode and control logic 6.

The size of the buffers in the subunits P1 . . . P4 depends on the traffic volume expected and the grade of service required. The greater the traffic volume to be expected and the higher the required grade of service, the larger the buffers will have to be. In principle, however, the capacities of the buffers cannot be such that it is certain that no incoming packet will be lost. In case of need, therefore, it must be ensured, e.g., in the terminals, that the lost packets will be supplied subsequently. It is also possible for the decode and control logic 6 to report an imminent or already existing overload via the control bus BUS to the outside in order to request further paths for switching packets. For this, use can also be made, at least for some links, of paths set up by circuit switching.

However, buffers are also necessary, for example, if the start of a packet must first be determined from the contents of the incoming data stream and if, nevertheless, the entire packet must be switched through. If packet switching is to be performed as described in the above-mentioned article by A. Thomas et al. with the aid of FIG. 9 of that article, the subunits P1 . . . P4 must also contain the functional units for synchronization. For the case in which the packets are so delayed that a broadband switching module 40 has to process the header of only a single packet at a time, the amount of circuitry required in the handling unit P and the decode and control logic 6 can be kept relatively small. It is sufficient, for example, if the address decoder PA is addressable from only one of the subunits P1 . . . P4 at a time. Also, in the second packet-switching matrix PK2, the decode and control logic 6 never has to activate two crosspoints at a time. Even if the header of a packet contains address information for only one link and the address must be changed in the handling unit P, the amount of circuitry required in the necessary modules will be smaller if it is never necessary to process two headers at the same time.

In the illustrated embodiment, which is a broadband switching module, i.e., a module operating at high speed, the combination of circuit switching and packet switching in accordance with the invention, unlike true circuit switching, requires that the crosspoints can be activated quickly. At least part of the decode and control logic 6 must, therefore, be capable of operating at a speed approximately equal to the transmission speed. For this reason, the decode and control logic 6 is divided into a slow portion 61 and a fast portion 62. The crosspoints in the first packet-switching matrix PK1 and in the switching matrix K are activated from the slow portion 61, and those in the second packet-switching matrix PK2 from the fast portion 62. The packet-handling unit P cooperates primarily with the fast portion 62.

In a digital switching network according to the invention, the broadband switching modules described can be used as switching facilities. By means of an appropriate central or decentralized control, paths for circuit-switched connections can be freely set up in a conventional manner. Alternatively, such paths can be preset for packet-switched messages. To this end, in each broadband switching module through which such a path is to lead, the first packet-switching matrix PK1 must connect one of the subunits P1 . . . P4 of the handling unit P to this path. In addition, the address decoder PA must be fed with the data required to properly route the packets subsequently to be switched on the path to be preset.

The present invention has been described above with regard to the structure, function and use of a presently contemplated specific embodiment of the invention. It should be appreciated by those skilled in the art that many modifications and variations are possible. Accordingly the exclusive rights afforded hereby should be broadly construed, limited only by the spirit and scope of the appended claims.

What is claimed is:

1. In a digital switching network having a plurality of inlets and outlets and a plurality of switching facilities each having a plurality of inputs and outputs through which possible paths for circuit-switched connections can be set up, each such possible path extending from a respective network inlet through at least one respective switching facility via an associated input and an associated output to a respective network outlet, with two of said possible paths for circuit-switched connections converging or diverging at a common said switching facility in which said two possible paths converge from a first pair of inputs of said common switching facility into a first single output of said common switching facility or in which said two possible paths diverge from a single input of said common switching facility into a pair of outputs of said common switching facility, the improvement comprising:
   packet switching setup means for designating on demand both of said two possible paths for circuit-switched connections as two respective preset packet switched paths that are temporarily simultaneously available on demand for packet-switched messages each comprising one or more data packets identified with one or the other of said respective preset paths, and
   packet switching means associated with at least said common switching facility for switching data packets identified with each of said two preset paths from the respective switching facility input associated with said each path to the respective switching facility output associated with said each path.

2. A combined circuit-switching and packet-switching facility comprising
   a plurality of input channels,
   a plurality of output channels,
   a switching matrix comprising a first set of crosspoint elements for connecting each output channel with every input channel,
   switching control logic responsive to external circuit switched control signals for controlling the first set of crosspoint elements to thereby effect one or more relatively permanent circuit switched connections between designated ones of said input channels and respective designated ones of said output channels, and
   a packet-handling unit comprising
      input selection means for connecting an input of the packet-handling unit to a selected one of the input channels,
      address decoder means for determining an associated one of said output channels from the information contained in a header of an input packet appearing at the selected input channel, and
      packet logic control means responsive to the address decoder means for causing the switching control logic to establish, for no longer than the duration of a single packet, a temporary packet-switched connection from the selected input channel to the output channel associated with said input packet.

3. A switching facility as claimed in claim 2, wherein said facility further comprises a second set of crosspoint elements;

said switching control logic is also coupled to said second set of crosspoint elements;

the packet-handling unit has an output port which is selectively connectable to each of the output channels via said second set of crosspoint elements;

said input packet passes through the packet-handling unit from said input to said output port, and the packet-handling unit further comprises processing means for processing said input packet before it appears at said output port.

4. A switching facility as claimed in claim 3, wherein said switching control logic further comprises a fast control logic for controlling the second set of crosspoint elements.

5. A switching facility as claimed in claim 4, wherein said fast control logic is faster than the portion of said switching control logic which controls said first switching matrix.

6. A switching facility as claimed in claim 3, wherein said processing means synchronizes said input packet before it appears at said output port.

7. A switching facility as claimed in claim 3, wherein said processing means temporarily stores said input packet before it appears at said output port.

8. A switching facility as claimed in claim 3, wherein said processing means alters the header information of said input packet before it appears at said output port.

* * * * *